US011511632B2

(12) United States Patent
Heydel et al.

(10) Patent No.: US 11,511,632 B2
(45) Date of Patent: Nov. 29, 2022

(54) ELECTRIC POWERTRAIN WITH BATTERY SYSTEM HAVING MULTI-POLE HIGH-VOLTAGE CONTACTOR

(71) Applicant: GM GLOBAL TECHNOLOGY OPERATIONS LLC, Detroit, MI (US)

(72) Inventors: Robert J. Heydel, Clawson, MI (US); Christopher Schlaupitz, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 17/036,554

(22) Filed: Sep. 29, 2020

(65) Prior Publication Data

US 2022/0097538 A1    Mar. 31, 2022

(51) Int. Cl.
| | |
|---|---|
| *B60L 53/10* | (2019.01) |
| *B60L 58/19* | (2019.01) |
| *H02J 7/00* | (2006.01) |
| *H01M 10/44* | (2006.01) |

(52) U.S. Cl.
CPC .............. *B60L 53/11* (2019.02); *B60L 58/19* (2019.02); *H01M 10/441* (2013.01); *H02J 7/0019* (2013.01); *B60L 2210/10* (2013.01); *B60L 2210/30* (2013.01); *H01M 2220/20* (2013.01); *H02J 2310/48* (2020.01)

(58) Field of Classification Search
CPC ...... B60L 53/11; B60L 58/19; B60L 2210/10; B60L 2210/30; B60L 53/16; H01M 10/441; H01M 2220/20; H02J 7/0019; H02J 2310/48; H02J 7/0024; Y02E 60/10; Y02T 10/70; Y02T 10/7072; Y02T 10/72; Y02T 90/12; Y02T 90/14
See application file for complete search history.

(56) References Cited

U.S. PATENT DOCUMENTS

| | | | |
|---|---|---|---|
| 10,974,617 B2* | 4/2021 | Hiroe ..................... | B60W 10/26 |
| 2019/0126761 A1* | 5/2019 | Verbridge ........... | H01M 10/441 |

* cited by examiner

*Primary Examiner* — Nha T Nguyen
(74) *Attorney, Agent, or Firm* — Quinn IP Law

(57) ABSTRACT

A battery system includes high-voltage switches, including a multi-pole contactor. Multiple packs are connectable in a series or parallel configuration via the switches. The contactor includes first and second pairs of electrical terminals separated by a respective circuit gap, with respective contactor arms simultaneously closing or opening the gaps. At all times, internal switches formed by the gaps and arms have the same ON/OFF state corresponding to the circuit gaps both being closed or both being open. Two of the contactors may be used to connect the battery packs to a DC fast-charging station, and to connect electrode terminals of the battery packs to a bus rail, respectively. An electric powertrain includes the battery system and an electrical load, including a rotary electric machine, that is connected to a power inverter and to a mechanical load.

20 Claims, 4 Drawing Sheets

|  | SA1 | SB1 | 40U | 40L | S-A | S-B |
|---|---|---|---|---|---|---|
| PSA | X | X | OO | XX | O | O |
| DCFC-S | X | O | XX | OO | X | X |
| DCFC-P | X | X | XX | XX | O | O |

ELECTRIC POWERTRAIN WITH BATTERY SYSTEM HAVING MULTI-POLE HIGH-VOLTAGE CONTACTOR

INTRODUCTION

The present disclosure relates to a high-voltage battery system, e.g., of the type used to power propulsion functions aboard a battery electric vehicle ("BEV"), hybrid electric vehicle ("HEV"), or other mobile platform, as well as to an electric powertrain having such a battery system as part of an onboard direct current (DC) power supply. More particularly, the disclosure pertains to a battery system and an electric powertrain having one or more high-voltage multi-pole contactors constructed and operating as set forth herein to provide two different circuit path connections within the battery system and electric powertrain using one switching control action.

An electric powertrain typically includes one or more polyphase/alternating current/alternating current (AC) rotary electric machines constructed from a wound stator and a magnetic rotor. Individual phase leads of the electric machine are connected to a power inverter, which in turn is connected to a direct current (DC) voltage bus. When the electric machine functions as a traction or propulsion motor, control of the individual ON/OFF switching states of various semiconductor switches housed within the power inverter generates an AC output voltage at a level suitable for energizing the electric machine. The energized phase windings ultimately produce a rotating magnetic field that interacts with a rotor field to produce machine rotation and motor output torque.

A multi-cell DC battery pack forms a core part of a battery system, with the latter also referred to as a rechargeable energy storage system (RESS). The battery pack, which is connected across positive and negative bus rails of a DC voltage bus, may be selectively recharged in some battery systems using an off-board charging station. When the charging station produces a charging voltage having an AC waveform, an AC-DC converter converts the AC charging waveform to a DC waveform suitable for charging the constituent battery cells of the battery pack. Alternatively, a DC fast-charging ("DCFC") station may be used to deliver high-voltage DC charging waveform as a relatively high-power/high-speed charging option. The battery system may include two or more battery packs. In order to take full advantage of higher charging voltages that may be available at a given charging station, some battery systems are automatically reconfigurable to establish a series-connected configuration of the multiple constituent battery packs, with a parallel-connected configuration being used for propulsion modes or for charging using a lower-voltage charging station.

SUMMARY

A high-voltage multi-pole contactor is disclosed herein, along with a multi-pack battery system and electric powertrain using the same. An embodiment of the battery system includes first and second battery packs. The battery packs are selectively connectable via a set of high-voltage switches in either a series-connected configuration (S-configuration) or a parallel-connected configuration (P-configuration). The switching control decision is made automatically by an onboard controller prior to battery system charging, with the controller determining associated switching states of the individual switches based in part on an available charging current from an off-board DC fast-charging (DCFC) station.

With two battery packs having equal pack voltages, the S-configuration effectively enables charging to occur at twice the voltage capability of each individual battery pack, for example at 800V when each battery pack has a voltage capability of 400V. However, the switching circuit topology necessary for connecting multiple battery packs in parallel tends to be complex as noted herein, which in turn leads to increased cost, mass, and hardware/software circuit complexity.

The battery system of the present disclosure according to an exemplary embodiment includes a set of high-voltage switches, including at least one multi-pole contactor constructed as set forth herein. The battery system further includes first and second battery packs that are selectively connectable in the S-configuration or the P-configuration as needed via operation of the switches.

The multi-pole contactor includes first and second internal switches having the same ON or OFF switching state. That is, the first and second internal switches are either both ON/conducting or both OFF/non-conducting, unlike constructions that package a pair of separately-controlled two-terminal/single-pole switches into one switch housing. The first internal switch is formed from a first pair of electrical terminals separated by a first circuit gap, and a first contactor arm configured to close or open the first circuit gap. Similarly, the second internal switch includes a second pair of electrical terminals separated by a second circuit gap, and a second contactor arm configured to close or open the second circuit gap. Thus, an ON/conducting state of the contactor corresponds to the first and second circuit gaps both being closed, with an OFF/non-conducting state of the contactor being present when the first and second circuit gaps are opened.

The battery system may include a DC charge coupler configured to connect the battery system to an offboard DCFC station. The first battery pack includes a positive electrode terminal. The second battery pack includes a negative electrode terminal. In this embodiment, the at least one multi-pole contactor includes a first multi-pole contactor connected to the DC charge coupler, the positive electrode terminal of the first battery pack, and the negative electrode terminal of the second battery pack.

An input side of the contactor, which is formed by one of the electrical terminals of each of the first and second pairs of electrical terminals ("input terminals") may be connected to the DC charge coupler. An output side of the contactor, formed by the remaining electrical terminal of each of the first and second pairs of electrical terminals ("output terminals"), may be connected to the negative electrode terminal of the second battery pack and the positive electrode terminal of the first battery pack.

In a possible implementation, the battery system may be configured for use with a DC voltage bus. The at least one multi-pole contactor may include the above contactor ("first multi-pole contactor") and a second multi-pole contactor. Output terminals of the second multi-pole contactor are connected to respective negative electrode terminals of the first and second battery packs. Input terminals of the second multi-pole contactor in this embodiment are selectively connectable to a negative bus rail of the DC voltage bus. For clarity, the first multi-pole contactor is referred to herein as an "upper" or "charging" contactor, while the second multi-pole contactor is referred to as the "lower" or "negative" contactor.

Inclusive of the first and second multi-pole contactors, the battery system may have a total of eight of the high-voltage switches in a possible embodiment, with the contactors each treated as a single switch due to the internal switches having the same ON/OFF state.

A controller may be coupled to the high-voltage switches and configured to transmit a mode selection signal thereto. The mode selection signal selectively controls a respective ON/OFF state of each of the high-voltage switches to thereby transition the battery system from the S-configuration to the P-configuration, and vice versa.

The high-voltage switches may include, for each respective one of the first battery pack and the second battery pack, a respective pre-charge switch and two-position/two-state switch in parallel with the pre-charge switch.

An electric powertrain is also disclosed herein. A possible configuration of the electric powertrain includes a mechanical load, a controller, and the battery system summarized above. The electrical load includes a rotary electric machine connected to a power inverter module and coupled to the mechanical load. The battery system is in communication with the controller and configured to power the electrical load.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
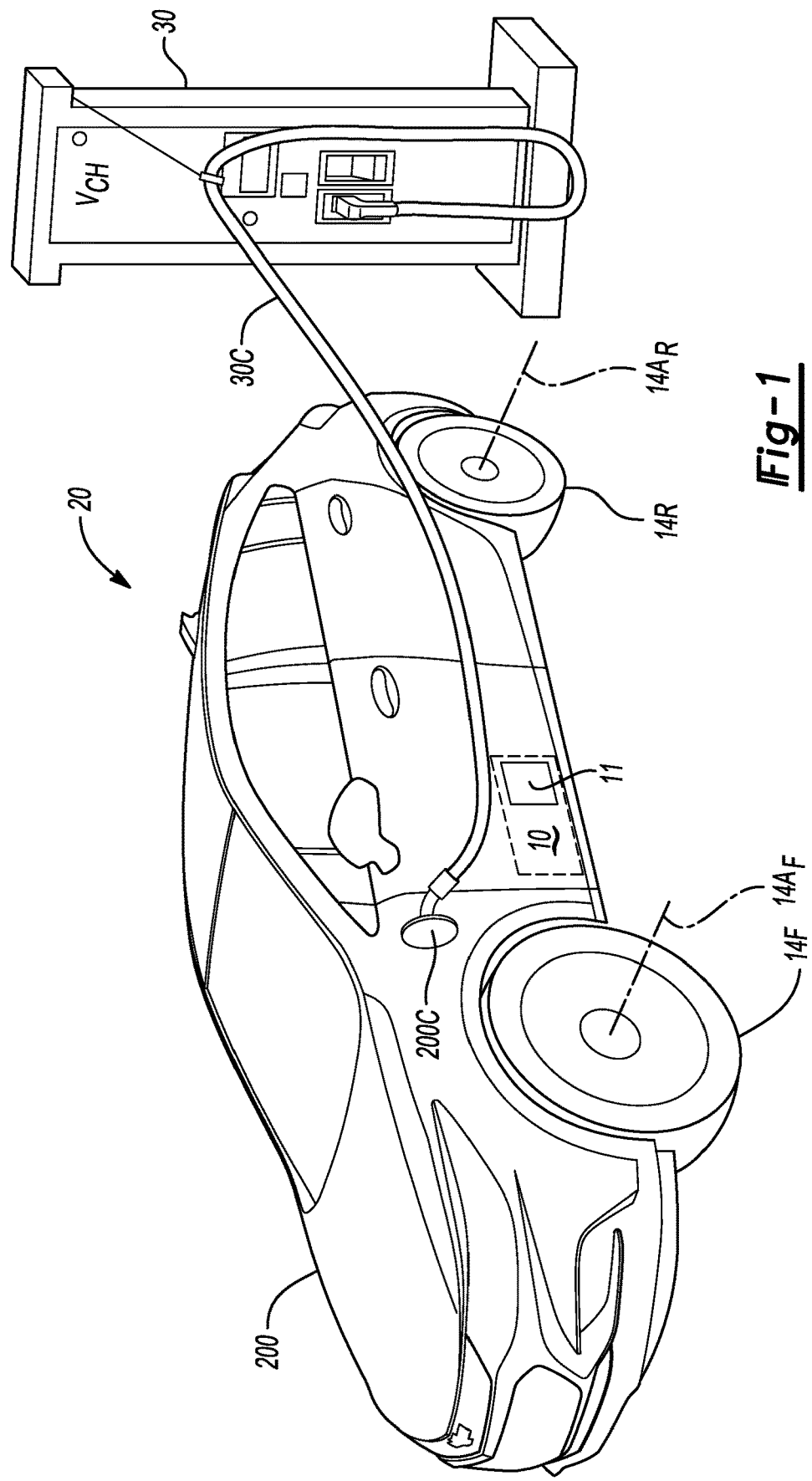
FIG. 1 is a schematic illustration of an exemplary motor vehicle undergoing a direct current (DC) fast-charging operation, with the motor vehicle having a high-voltage battery system and a pair of multi-pole contactors arranged as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 3:
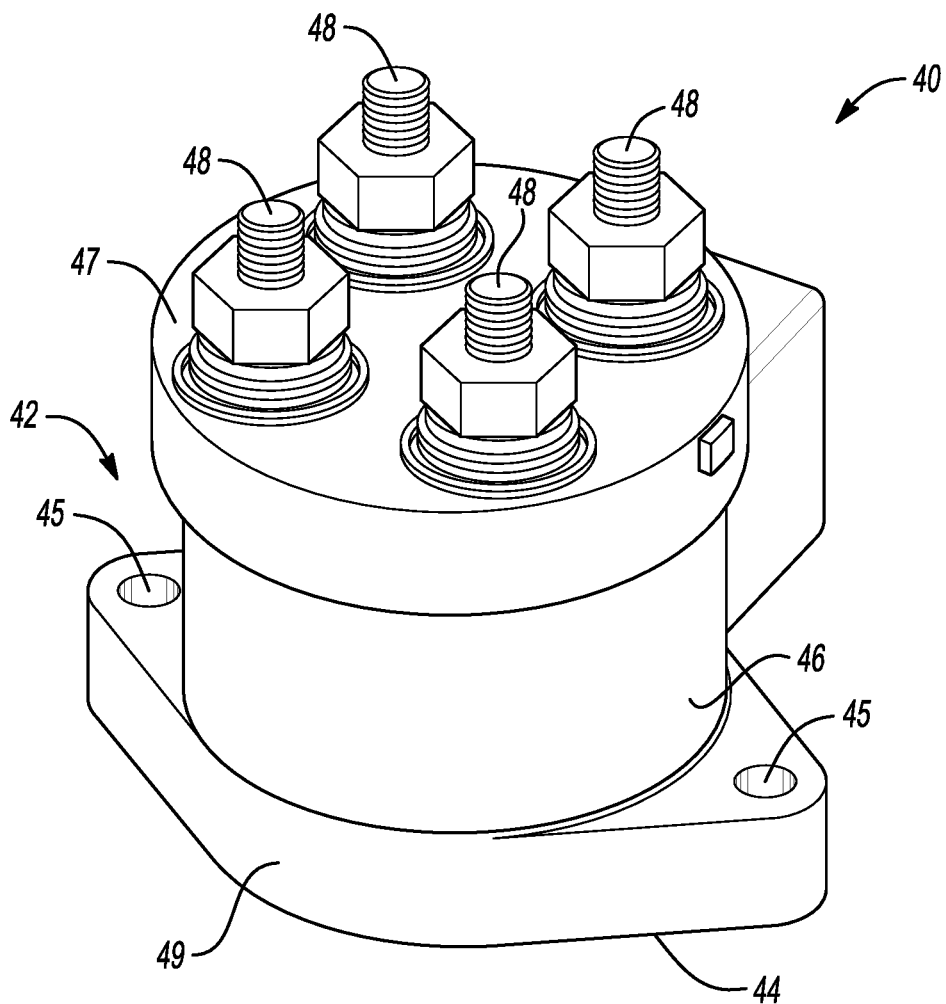
FIG. 3 is a schematic perspective view illustration of a representative multi-pole contactor in accordance with the disclosure.
Figures 4, 6:
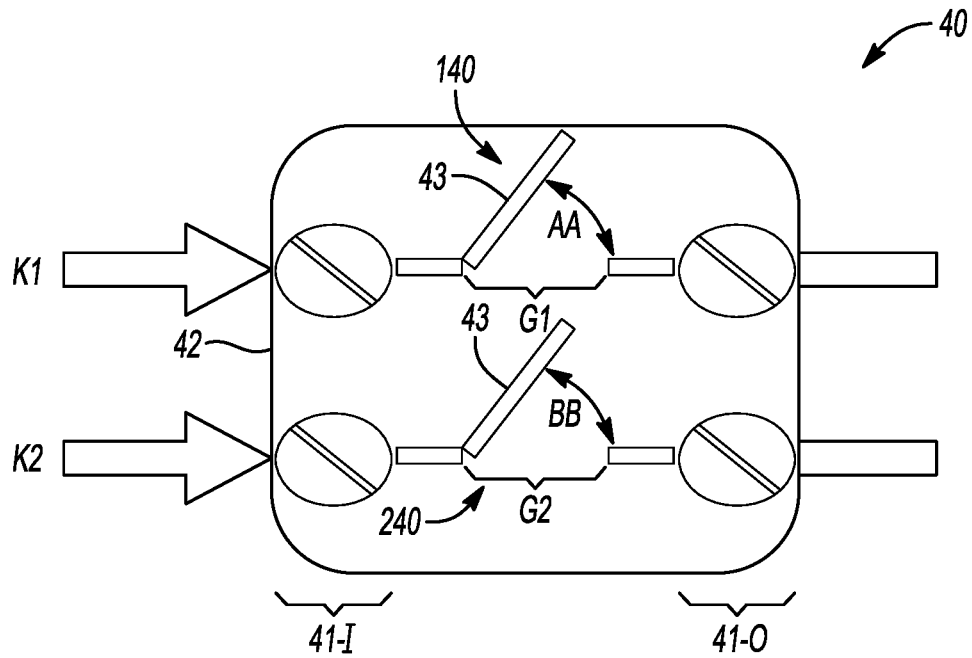
FIG. 4 is a schematic plan view illustration of the multi-pole contactor shown in FIG. 3.
FIG. 6 is a truth table depicting the ON/OFF states of the high-voltage switches shown in FIG. 5.

Referring to the drawings, wherein like reference numbers refer to the same or like components in the several Figures, an electric powertrain 10 is shown in FIG. 1. The electric powertrain 10 includes a battery system 11 having a pair of high-voltage multi-pole contactors 40, an exemplary embodiment of which is depicted in FIGS. 3 and 4.

As will be appreciated by those of ordinary skill in the art, redundancy requirements for implementing current high-voltage battery systems having multiple series-configured (S-configured) battery packs require controllable switches to be arranged at particular locations. Automotive-grade contactors used for this purpose are typically available as two-terminal/ON-OFF state contactors. Such devices have just two binary states, i.e., ON/closed and OFF/open. Connecting multiple high-voltage battery packs in a parallel-connected configuration (P-configuration) effectively doubles the number of required electrical switches in a switching control circuit, along with requiring a second layer of hardware and software redundancy.

Future battery electric vehicle applications in particular envision the use of high-power charging and propulsion electrical loading. Higher available charging voltages provide the opportunity to meet these increased power requirements without increasing a corresponding electrical current. This enables the use of smaller onboard electrical components such as voltage bus bars, cables, contactors, switches, and connectors. The present solutions are therefore intended to facilitate such applications and other similar high-voltage/S-configured battery operations using the disclosed multi-pole contactors 40, which establish, at specific circuit locations, two separate circuit path connections using one switching control action.

The particular configuration, circuit placement, and control of the multi-pole contactors 40 described herein in turn reduces the required number of contactors within the battery system 11 or other electrical systems having multi-leg electrical connections. Each contactor 40 includes four electrical terminals 41 (see FIG. 4) arranged in two terminal pairs to provide two different circuit paths K1 and K2 through the contactor 40. When used in the battery system 11 of FIGS. 1 and 5, the contactors 40 eliminate the need for associated controls and diagnostic checks, circuit redundancies, and associated costs of implementing similar circuit connections using typical two-terminal contactors of the types noted briefly above and well understood in the art.

The electric powertrain 10 shown in FIG. 1 in some embodiments may be used as part of a motor vehicle 20 or other mobile system having a vehicle body 200. The vehicle body 200 may be connected to a set of road wheels 14F and 14R, with "F" and "R" in this instance referring to the respective front and rear positions of drive axles $14A_F$ and $14A_R$ on which the road wheels 14F and 14R are respectively disposed. The motor vehicle 20 may be alternatively embodied as a marine vessel, aircraft, rail vehicle, robot, or other mobile platform, and therefore the present teachings are not limited to vehicular applications in general or automotive vehicles in particular.

The motor vehicle 20 is depicted in FIG. 1 in the process of undergoing a direct current fast-charging (DCFC) operation. During such an operation, the battery system 11 is electrically connected to an off-board DCFC station ($V_{CH}$) 30 via a vehicle charging port 200C internally coupled to the battery system 11. The electric powertrain 10 uses multiple battery packs, with two such battery packs shown as respective first and second battery packs 12A and 12B in FIG. 5. The battery system 11 may be variously embodied as a multi-cell lithium ion, zinc-air, nickel-metal hydride, or other suitable battery chemistry configuration.

Figure 5:
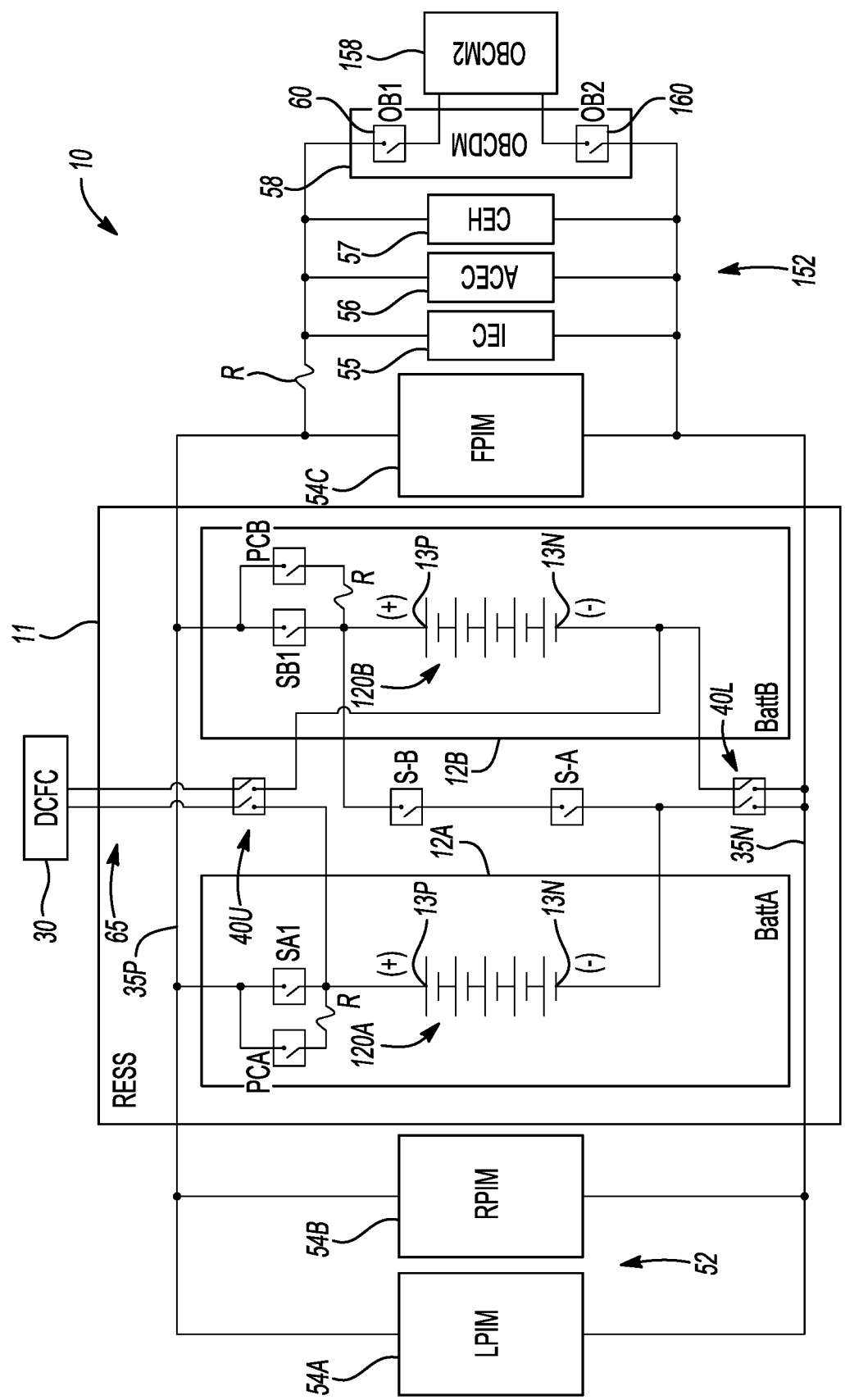
FIG. 5 is a schematic circuit diagram for implementing portions of an electric powertrain using two of the multi-pole contactors of FIGS. 3 and 4, e.g., as part of an electric powertrain of the motor vehicle shown in FIG. 1.

The exemplary architecture described below with reference to FIG. 5 enable improved utilization of a charging voltage from the charging station 30 at different voltage levels when the battery system 11 is optionally configured as a multi-pack battery system 11 as shown in FIG. 5. For instance, the motor vehicle 20 may be propelled at a lower P-configured voltage level, e.g., 400-500V, and then selectively reconfigured during charging to receive a charging voltage at a higher S-configured voltage level, e.g., 800-1000V in this non-limiting example embodiment. Other voltage levels may be contemplated within the scope of the disclosure, and thus the nominal 400V/800V example is non-limiting.

As will be appreciated by those of ordinary skill in the art, the various propulsion modes enabled by the architectures described herein may include all-wheel drive ("AWD"), front-wheel drive ("FWD"), or rear-wheel drive ("RWD") propulsion modes depending on battery power, control configurations, and possibly other relevant factors. Likewise, the present teachings enable independent propulsion of the road wheels 14R relative to each other, i.e., a left-side/driver-side road wheel 14R may be independently powered by the electric powertrain 10 as set forth below.

In FIG. 1, the charging port 200C is internally connected to a DC charge coupler 65 (FIG. 5) of/coupled to the battery system 11, with the charging port 200C connected to the charging station 30 using a length of high-voltage charging cable 30C. Although not depicted in FIG. 1, but well understood in the art, a terminal end of the charging cable 30C configured to connect to the charging port 200C may be embodied as an SAE J1772 or another suitable charge connector. However, the present teachings are independent of the particular charging standard ultimately employed in a DCFC operation, and therefore the above-noted examples are merely illustrative.

Figure 2:
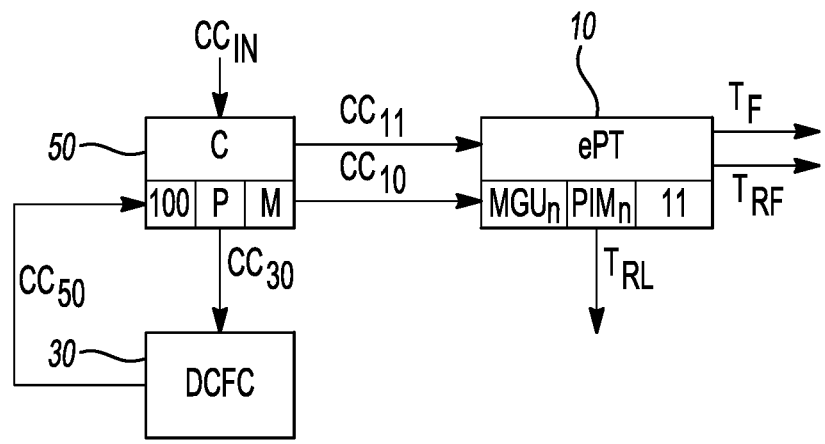
FIG. 2 is a schematic flow diagram depicting a controller of the motor vehicle of FIG. 1 in communication with an offboard DC fast-charging station and an electric powertrain of the motor vehicle.

Referring briefly to FIG. 2, the electric powertrain (ePT) 10 includes an electronic control unit or controller (C) 50 configured to control powerflow operations aboard the motor vehicle 20 shown in FIG. 1. Accordingly, the controller 50 is configured to receive input signals (arrow $CC_{IN}$) from various sensors or other control units (not shown), and to execute instructions 100 in response to the input signals (arrow $CC_{IN}$) to thereby perform the indicated switching control functions enabling charging or propulsion, including instructions for implementing the switching states depicted in table 70 of FIG. 6 as explained below.

In the broad scope of possible operations, the input signals (arrow $CC_{IN}$) may include a number of possible values, e.g., temperature, commanded and estimated operating speed, switch activation signals, required charging power, current state of charge, etc. In response, the controller 50 may transmit control signals (arrows $CC_{10}$ and $CC_{11}$) to the respective electric powertrain 10 and battery system 11, inclusive of switching control signals to the various high-voltage switches described below with reference to FIGS. 3-5, to ensure that the electric powertrain 10 allocates front and/or rear torque (arrows TF and $T_{RR}$, $T_{RL}$) to the front and/or rear axles $14A_F$ or $14A_R$, or to the individual road wheels 14F or 14R connected thereto.

Likewise, the control signals may encompass charging control signals (arrow $CC_{30}$) and feedback signals (arrow $CC_{50}$) in a two-way communication with the DCFC station 30 during a DC fast-charging session. That is, the input signals (arrow $CC_{IN}$) may include an available charging voltage from the DCFC station 30, which may be determined during charging as part of ongoing communication between the controller 50 and the DCFC station 30, e.g., upon connection of the motor vehicle 20 to the DCFC station 30, as will be appreciated by those of ordinary skill in the art.

In terms of its hardware configuration, the controller 50 of FIG. 2 includes a processor (P) and memory (M). The memory (M) includes tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute the instructions 100 during charging and propulsion modes, as noted above, which includes performing switching control operations of the specific switches described below with reference to FIG. 5.

The controller 50 is in communication with the various controlled components of the electric powertrain (ePT) 10 via a suitable communications framework and protocol, e.g., a controller area network (CAN) bus or other differential voltage signal lines. Receipt of the signals (arrows $CC_{10}$ and $CC_{11}$) by associated components of the electric powertrain 10 and battery system 11 causes one or more (i.e., "n") motor-generator units (MGUn), each coupled via a respective power inverter modules (PIMn), to a rechargeable energy storage system (RESS), i.e., the battery system 11, to generate the indicated motor torques (arrows $T_F$, $T_{RL}$, $T_{RR}$), with the latter two values, i.e., $T_{RL}$ and $T_{RR}$, corresponding to torque provided to the right-side and left-side rear road wheels 14R in an exemplary embodiment in which the rear road wheels 14R are independently driven via a corresponding wheel motor. As appreciated in the art, the motor-generator units (MGUn) may be configured as high-voltage electric traction or propulsion motors, in the form of a polyphase/AC traction or propulsion motor having a concentric stator and rotor (not shown), with the rotor being connected directly or indirectly to one or more of the road wheels 14F and/or 14R.

An exemplary automotive-grade implementation of the present multi-pole contactor 40 is depicted in FIG. 3. A housing 42 in this embodiment includes a planar base 49 defining through-holes 45 and having a flat undersurface 44 facilitating mounting of the contactor 40 to a substrate, e.g., of the battery system 11 of FIGS. 1 and 5 in the present disclosure. A generally cylindrical contactor body 46 may protrude from the base 44 and contain four electrical terminals 41 (see FIG. 4). The contactor body 46 may be connected/potted to an end cap 47, which in turn is secured to the contactor body 46 by a set of fasteners 48 having axial locations coinciding with the electrical terminals 41 of FIG. 4.

Referring to FIG. 4, the multi-pole contactor 40 is shown in a schematic plan view to illustrate the dual-connection/same-state switching functional thereof. As shown, the contactor 40 includes a first pair of electrical terminals 41 separated from each other by a first circuit gap G1 lying in or along a first circuit path K1. A second pair of electrical terminals 41 is likewise separated from each other by a second circuit gap G2 along a second circuit path K2. One terminal 41 from each of the pairs of electrical terminals 41 together form an input terminal pair 41-I of the contactor 40, with the remaining terminal 41 of each of the pairs of electrical terminals 41 forming an output terminal pair 41-O.

Within the multi-pole contactor 40, a pair of elongated contactor arms 43 is configured, in response to a corresponding switch control or activation signal transmitted as part of the input signals (arrow $CC_{IN}$ of FIG. 2) as noted above, to open or close in unison as indicated by arrows AA and BB. In an ON/conducting state of the contactor 40, the contactor arms 43 are both coaxial with the first and second circuit paths K1 and K2, and thus simultaneously fill and close the respective first and second circuit gaps G1 and G2 to connect the input terminal pair 41-I to the output terminal pair 41-O. The depicted construction thus entails two internal switches 140 and 240 that open or close in unison, such that the internal switches 140 and 240 have the same ON/OFF states. That is, the internal switch 140 cannot be opened while internal switch 240 remains closed, or vice versa. Rather, one switching control signal from the controller 50 of FIG. 2 opens or closed both internal switches 140 and 240 at the same time.

In the non-limiting example application of FIG. 5, for instance, this unified switching action of the multi-pole contactor 40U, with "U" referring to the nominal upper position within the depicted circuit, is used to electrically connect the DC charge coupler 65 to the positive electrode terminal 13P of the first battery pack 12A, as well as to the negative electrode terminal 13N of the second battery pack 12B. Another contactor 40 may be used for redundancy to connect the negative electrode terminals 13N to the negative rail 35N, with such a contactor 40 labeled as 40L ("lower") in FIG. 5 for clarity, and also referred to herein as the negative contactor 40L due to its specific function.

The controller 50 of FIG. 2 may perform switching control of the battery system 11 to ultimately generate and deliver motor torque to the road wheels 14F and/or 14R and thereby propel the motor vehicle 20 shown in FIG. 1. In a charging operation, the controller 50 may likewise perform switching control operations to provide one of a number of possible charging modes. The controller 50 is thus optionally configured to select between the series-configured (S-configured) and the parallel-connected (P-configured) arrangements and corresponding DCFC modes. Use of the contactors 40 at the indicated locations of FIG. 5 facilitates such S-configured/P-configured arrangements to help reduce cost, mass, and complexity, both in terms of structure and attendant control logic.

Referring to FIG. 5, the battery system 11 in an exemplary two-pack variant functioning as a rechargeable energy storage system (RESS), may include the first and second battery packs 12A (BattA) and 12B (BattB) arranged between and connected to/across positive (+) and negative (−) bus rails 35P and 35N of a high-voltage DC voltage bus. The respective first and second battery packs 12A and 12B have corresponding positive (+) and negative (−)electrode terminals 13P and 13N, and together or alone power an electrical load 52 and/or 152. Resistors (R) may be used at the indicated locations, e.g., as current limiters.

A pair of the multi-pole contactors 40 of FIGS. 3 and 4 is disposed between the first and second battery packs 12A and 12B, with the contactors 40 labeled as 40U and 40L to indicate respective nominal "upper" and "lower" positions within the battery system 11 relative to the location of the positive and negative bus rails 35P and 35N, as noted above. Contactor 40U is positioned and configured to connect the DCFC station 30 to the positive electrode terminal 13P of the first battery pack 12A via the intervening DC charge coupler 65. Contactor 40L connects the negative electrode terminals 13N to the negative bus rail 35N, and therefore may be thought of as the negative contactor. Such a contactor 40L, though not strictly necessary in the battery system 11, may be used to provide redundancy and other circuit disconnection functions, as will be appreciated by those of ordinary skill in the art.

The representative electrical loads 52 and 152 may include one or more high-voltage devices, such as but not limited to one or more power inverter modules 54A and 54B (electrical load 52) and 54C (electrical load 152), integrated power electronics (IEC) 55, an air conditioning electric compressor (ACEC) 56, a cabin electric heater (CEH) 57, and one or more onboard charging modules (OBCM) 58 and (OBCM2) 158. When the OBCM2 158 is used, e.g., to selectively increase the charging rate/decrease charging time, switches 60 (OB1) and 160 (OB2) coupled to the positive and negative rails 35P and 35N may be used to selectively connect or disconnect the OBCM2 158 as needed.

With respect to the power inverter modules 54A, 54B, and 54C in particular, the illustrated battery system 11 enables various powertrain constructions to deliver power to the front road wheels 14F of FIG. 1, e.g., in a front wheel drive or all-wheel drive mode, or to deliver power to the rear road wheels 14R in a rear-wheel drive or AWD mode. When powering the rear road wheels 14R, the construction of FIG. 4 enables a left rear road wheel 14R and a right rear road wheel 14R to be separately or independently energized. In such an embodiment, a left power inverter module 54A (LPIM) and a right power inverter module 54B (RPIM) may be connected to a respective rotary electric machine as part of the overall electrical load 52, with such electric machines depicted schematically in FIG. 2 as MGUn.

Operation of the power inverter modules 54A, 54B, and 54C utilizes high-speed switching operations of semi-conductor switching dies of IGBTs, MOSFETs, and/or other applicable-suitable semiconductor switches each having an ON/OFF state controlled by the controller 50 via pulse-width modulation (PWM), pulse-density modulation (PDM), or another switching control technique. Auxiliary voltage-level batteries (not shown) and other devices may also be connected to the battery system 11 in a full implementation, with such devices and possible DC-DC converters omitted from FIG. 5 for illustrative simplicity.

The respective first and second battery packs 12A and 12B have respective cell stacks 120A and 120B, with the particular configuration and battery chemistry of the cell stacks 120A and 120B being application-specific, as noted above. S-configured and P-configured arrangements of the battery system 11 may be achieved via the controller 50 of FIG. 2 by individually controlling the ON/OFF states of the collective set of high-voltage switches. In the exemplary FIG. 5 embodiment, such switches are located within the first battery pack 12A and include a pre-charge switch PCA and a first two-position/single-pole switch SA1. Similarly, the second battery pack 12B includes a pre-charge switch PCB and a second two-position/single-pole switch PCB. Switches SA1 and SB1 and respective pre-charge switches PCA and PCB connect/disconnect the respective first and second battery packs 12A and 12B to/from the positive bus rail 35P, with pre-charge switches PCA and PCB in parallel with respective switches SA1 and SB1, as is well understood in the art of battery pre-charge circuitry.

Still referring to FIG. 5, for implementation the S-configured/P-configured arrangements, the battery system 11 may also include a pair of series switches S-A and S-B disposed between the first and second battery packs 12A and 12B. As with the switches SA1 and SB1, the series switches S-A and S-B are typically embodied as two-position/single-pole switches, with the use of two such switches S-A and S-B providing hardware redundancy within the indicated path between the negative electrode terminal 13N of the first battery pack 12A and the positive electrode terminal 13P of the second battery pack 12B.

FIG. 6 depicts a table 70 describing ON/OFF state positions for the various high-voltage switches shown in FIG. 5 during a "propulsion system active" (PSA) mode, a series-connected DC fast-charging (DCFC-S) mode, and a parallel-connected DC fast-charging (DCFC-P) mode. The ON/conducting state position (X) indicates that the corresponding switch is commanded closed by the controller 50 of FIG. 2, which enables a battery current to pass from the input terminal pair 41-I to the output terminal pair 41-O of FIG. 4. Likewise, an OFF/non-conducting state position (O) indicates that the switch is commanded open, thereby interrupting the first and second circuit paths K1 and K2 of FIG. 4 to prevent the battery current from reaching the output terminal pair 41-O. The pre-charge switches PSA and PSB are omitted for simplicity, with functions thereof well understood in the art.

To establish the P-configuration of the respective first and second battery packs 12A and 12B during propulsion and charging modes, i.e., parallel modes PSA and DCFC-P, the series switches S-A and S-B are commanded to open (O) by the controller 50 of FIG. 2, with the same two series switches S-A and S-B being closed (X) when establishing the S-configuration for charging, i.e., DCFC-S. Switch SA1 remains closed (X) for all three modes, but may be selectively opened by the controller 50 shown in FIG. 2 in response to a fault mode as needed, to disconnect the first battery pack 12A from the positive bus rail 35P. Corresponding switch SB1 in the second battery pack 12B is opened (O) during the series-connected DCFC-S mode and closed (X) for both parallel-connected modes PSA and DCFC-P.

With respect to the multi-pole contactors 40U and 40L shown in FIG. 5, the switching function enabled by the structure of FIG. 4 provides for an ON/closed/conducting state (XX) in which both of the respective first and second circuit gaps G1 and G2 are closed by an intervening contactor arm 43, i.e., internal switches 140 and 240, and an OFF/open/non-conducting state (00) in which both of the first and second circuit gaps G1 and G2 are open. The unique structure of FIG. 4 precludes a state in which just one of the first or second circuit gaps G1 or G2 is open.

PSA Mode: when the propulsion system is active, i.e., the indicated PSA mode, the contactor 40U is commanded to the OFF state (00), while the negative/lower contactor 40L is command ON (XX), with the two-character state abbreviation indicating the corresponding state of each of the internal switches 140 and 240 of FIG. 4. At the same time, the series switches S-A and S-B are both commanded open (O) to ensure that the respective first and second battery packs 12A and 12B remain connected in parallel. Switches SA1 and SB1 remain closed. While a series propulsion modes may be optionally implemented, assuming sufficiently increased sizing and construction of the constituent electrical and powertrain components to handle the increased voltages, such a mode is not contemplated in the modes of FIG. 6. However, were such a series-propulsion mode to be implemented, both of the series switches S-A and S-B would be closed.

DCFC-S: when charging the battery system 11 at the higher/combined pack voltage via the DCFC station 30 of FIG. 1 in the series charging mode DCFC-S, the two series switches S-A and S-B are both commanded closed. Switch SB1 located within the second battery pack 12B is opened. The multi-pole contactor 40U is commanded ON/closed, i.e., with the first and second circuit gaps G1 and G2 of FIG. 4 both closed by separate intervening contactor arms 43. The optional lower/negative contactor 40L located between the negative electrode terminals 13N and the negative bus rail 35N for redundancy is commanded OFF/opened, i.e., with the first and second circuit gaps G1 and G2 opening to thereby break the circuit and prevent a flow of battery current to the output terminal pair 41-O shown in FIG. 4. This switching control action ultimately forces battery current through the closed series switches S-A and S-B and into the positive electrode terminal 13P of the second battery pack 12B.

DCFC-P: when charging the battery system 11 in the parallel charging mode DCFC-P, the series switches S-A and S-B are both opened. Then, to connect the first and second battery packs 12A and 12B across the positive and negative bus rails 35P and 35N, the switches SA1 and SB1 are both closed. The multi-pole contactor 40U may be commanded to the ON state/closed so enable charging current from the DCFC station 30 to enter the battery system 11. The lower/negative contactor 40L when used is likewise commanded to the ON state/closed, thereby ensuring that the respective first and second battery packs 12A and 12B are connected to the negative bus rail 35N through the contactor arms 43 within the contactor 40L.

As will be appreciated by one of ordinary skill in the art, the circuit topology noted above may be used with electric vehicles and other systems having increased high-power charging requirements. With legacy DC fast-charging infrastructure generally on the order of 300-500V or less, the disclosed multi-pack embodiment of the battery system 11 enables use of two or more battery packs, e.g., the first and second battery packs 12A and 12B, to provide FWD, RWD, or AWD propulsion capability to the motor vehicle 20 of FIG. 1, with legacy or high-power charging both being options, and while preserving the capability of powering connected loads during charging.

In this context, the use of the multi-pole contactor 40 of FIG. 1 facilitates switching between first and second circuit paths K1 and K2 of FIG. 4 to implement charging at lower or higher voltage levels. The multiple terminal construction of the contactor 40 helps eliminate additional switches while minimizing associated control and diagnostic complexity. These and other potential benefits will be readily appreciated by those skilled in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery system for powering a load, the battery system comprising:
   a set of high-voltage switches, including a multi-pole contactor;
   a first battery pack; and
   a second battery pack, wherein the multi-pole contactor is positioned between the first battery pack and the second battery pack, wherein the first battery pack and the second battery pack have a respective negative electrode terminal and positive electrode terminal and are selectively connectable to the load in a series-configuration (S-configuration) or a parallel-configuration (P-configuration) via operation of the set of high-voltage switches, and wherein the multi-pole contactor includes a first pair of electrical terminals separated by a first circuit gap, a first contactor arm configured to close or open the first circuit gap, a second pair of electrical terminals separated by a second circuit gap, and a second contactor arm configured to close or open the second circuit gap, wherein:

an ON/conducting state and an OFF/non-conducting state of the multi-pole contactor correspond to the first circuit gap and the second circuit gap both being closed or opened, respectively;

the input side of the multi-pole contactor is formed by one of the electrical terminals of each of the first and second pairs of electrical terminals and is connectable to a DC charge coupler during a charging mode; and the output side of the multi-pole contactor is formed by a remaining electrical terminal of each of the first and second pairs of electrical terminals and directly connected to the negative electrode terminal of the second battery pack and the positive electrode terminal of the first battery pack.

2. The battery system of claim 1, further comprising the DC charge coupler, wherein the DC charge coupler is configured to connect the battery system to a DC fast-charging (DCFC) station, and wherein the multi-pole contactor is connected to the DC charge coupler.

3. The battery system of claim 2, wherein the battery system is configured for use with a DC voltage bus having a negative bus rail, and multi-pole contactor is a first multi-pole contactor, the battery system further comprising a second multi-pole contactor connected to the negative electrode terminal of the first battery pack and the second battery pack, respectively, and selectively connectable to and disconnectable from the negative bus rail of the DC voltage bus.

4. The battery system of claim 3, wherein the battery system, inclusive of the first multi-pole contactor and the second multi-pole contactor, has a total of eight of the high-voltage switches.

5. The battery system of claim 1, further comprising a controller coupled to the high-voltage switches and configured to transmit a mode selection signal thereto, wherein the mode selection signal selectively controls a respective ON/OFF state of each of the high-voltage switches to thereby transition the battery system from the S-configuration to the P-configuration, and vice versa.

6. The battery system of claim 1, wherein the set of high-voltage switches includes, for each respective one of the first battery pack and the second battery pack, a respective pre-charge switch and two-position/two-state switch in parallel with the pre-charge switch.

7. The battery system of claim 1, wherein each of the first battery pack and the second battery pack has a respective voltage capability of at least 400V, such that the battery system, when in the S-configuration, has a total voltage capability of at least 800V.

8. The battery system of claim 1, wherein the load includes a power inverter module (PIM) and a rotary electric machine connected to the PIM.

9. The battery system of claim 1, wherein the multi-pole contactor includes a planar base configured to mount to a substrate of the battery system.

10. The battery system of claim 1, wherein the multi-pole contactor is rated for at least 800V.

11. The battery system of claim 1, wherein the multi-pole contactor is in an OFF/non-conducting state when the battery system powers the load.

12. An electric powertrain system comprising:
a mechanical load;
an electrical load, including a power inverter module (PIM) and a rotary electric machine, wherein the rotary electric machine is connected to the PIM and coupled to the mechanical load;
a controller; and
a battery system in communication with the controller and configured to power the electrical load, the battery system comprising:
a set of high-voltage switches, including at least one multi-pole contactor, the set of high-voltage switches being responsive to switching control signals from the controller;
a first battery pack; and
a second battery pack, wherein the multi-pole contactor is positioned between the first battery pack and the second battery pack, wherein the first battery pack and the second battery pack have a respective negative electrode terminal and positive electrode terminal and are selectively connectable to the load in a series-configuration (S-configuration) or a parallel-configuration (P-configuration) via operation of the set of high-voltage switches, and wherein the multi-pole contactor includes a first pair of electrical terminals separated by a first circuit gap, a first contactor arm configured to close or open the first circuit gap, a second pair of electrical terminals separated by a second circuit gap, and a second contactor arm configured to close or open the second circuit gap, wherein an ON/conducting state and an OFF/non-conducting state of the multi-pole contactor correspond to the first circuit gap and the second circuit gap both being closed or opened, respectively; wherein:

the input side of the multi-pole contactor is formed by one of the electrical terminals of each of the first and second pairs of electrical terminals and is connectable to a DC charge coupler during a charging mode; and the output side of the multi-pole contactor is formed by a remaining electrical terminal of each of the first and second pairs of electrical terminals and directly connected to the negative electrode terminal of the second battery pack and the positive electrode terminal of the first battery pack.

13. The electric powertrain system of claim 12, further comprising the DC charge coupler, wherein the DC charge coupler is configured to connect the battery system to a DC fast-charging (DCFC) station, and wherein the multi-pole contactor is connected to the DC charge coupler.

14. The electric powertrain system of claim 12, wherein the battery system is configured for use with a DC voltage bus having a negative bus rail, and multi-pole contactor is a first multi-pole contactor, the battery system further comprising a second multi-pole contactor connected to the negative electrode terminal of the first battery pack and the second battery pack, respectively, and selectively connectable to and disconnectable from the negative bus rail of the DC voltage bus.

15. The electric powertrain system of claim 12, wherein the battery system, inclusive of the first multi-pole contactor and the second multi-pole contactor, has a total of eight of the high-voltage switches.

16. The electric powertrain system of claim 12, further comprising a controller coupled to the high-voltage switches and configured to transmit a mode selection signal thereto, wherein the mode selection signal selectively controls a respective ON/OFF state of each of the high-voltage switches to thereby transition the battery system from the S-configuration to the P-configuration, and vice versa.

17. The electric powertrain system of claim 12, wherein the set of high-voltage switches includes, for each respective one of the first battery pack and the second battery pack, a respective pre-charge switch and two-position/two-state switch in parallel with the pre-charge switch.

18. The electric powertrain system of claim 12, wherein each of the first battery pack and the second battery pack has a respective voltage capability of at least 400V, such that the battery system, when in the S-configuration, has a total voltage capability of at least 800V.

19. The electric powertrain system of claim 12, wherein the mechanical load includes one or more road wheels of a motor vehicle.

20. The electric powertrain system of claim 12, wherein the multi-pole contactor is in an OFF/non-conducting state when the battery system powers the load.

* * * * *